(12) United States Patent
Hasegawa et al.

(10) Patent No.: US 10,223,038 B2
(45) Date of Patent: *Mar. 5, 2019

(54) FILE MANAGEMENT IN A FILE SYSTEM

(71) Applicant: International Business Machines Corporation, Armonk, NY (US)

(72) Inventors: Tohru Hasegawa, Tokyo (JP); Sosuke Matsui, Kanagawa (JP); Shinsuke Mitsuma, Tokyo (JP); Tsuyoshi Miyamura, Kanagawa (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,889

(22) Filed: Nov. 3, 2017

(65) Prior Publication Data

US 2018/0052640 A1    Feb. 22, 2018

Related U.S. Application Data

(63) Continuation of application No. 14/842,145, filed on Sep. 1, 2015, now Pat. No. 9,851,927.

(51) Int. Cl.
*G06F 3/06* (2006.01)
*G06F 17/30* (2006.01)

(52) U.S. Cl.
CPC .......... *G06F 3/0685* (2013.01); *G06F 3/0608* (2013.01); *G06F 3/0643* (2013.01);
(Continued)

(58) Field of Classification Search
CPC .... G06F 3/0685; G06F 3/0608; G06F 3/0643; G06F 17/30115; G06F 17/30218
See application file for complete search history.

(56) References Cited

U.S. PATENT DOCUMENTS 8,935,469 B2    1/2015 Haustein et al.
8,954,663 B1 *  2/2015 Klein ................... G06F 3/0619
                                              711/111
(Continued)

FOREIGN PATENT DOCUMENTS

DE    112012005271 T5    11/2014
JP       2002056008 A     2/2002
(Continued)

OTHER PUBLICATIONS

Pease et al., "The Linear Tape File System", IEEE, 2010, 8 pages.
(Continued)

*Primary Examiner* — Nanci N Wong
(74) *Attorney, Agent, or Firm* — Stephanie L. Carusillo

(57) ABSTRACT

A memory that includes a data partition and an index partition is mounted. The data partition includes an original data and an original index written directly after the original data. The index partition includes the original index at the beginning of the index partition. The first data is written to a data partition of the memory. The first data is written directly after the at least one data on the data partition and the original index is deleted and invalidated. Responsive to a time interval elapsing, a first index is written to the data partition of the memory directly after the first data. The time interval starts at the writing of the first data. Responsive to the time interval elapsing, the first index is written to the index partition of the memory at the closest location, in terms of movement time, to the first index on the data partition.

17 Claims, 5 Drawing Sheets

(52) U.S. Cl.
CPC ...... *G06F 3/0644* (2013.01); *G06F 17/30115* (2013.01); *G06F 17/30218* (2013.01)

(56) References Cited

U.S. PATENT DOCUMENTS

| | | | |
|---|---|---|---|
| 2007/0097801 A1* | 5/2007 | Ohishi | G11B 20/10 369/30.07 |
| 2011/0238905 A1* | 9/2011 | Amir | G11B 23/042 711/111 |
| 2014/0215145 A1 | 7/2014 | Ballard | |

FOREIGN PATENT DOCUMENTS

| | | | |
|---|---|---|---|
| JP | 2004362092 A | 12/2004 |
| JP | 2009176044 A | 8/2009 |
| JP | 2010515191 A | 5/2010 |
| JP | 2014123254 A | 7/2014 |
| JP | 2015041401 A | 3/2015 |

OTHER PUBLICATIONS

U.S. Appl. No. 14/842,145, filed Sep. 1, 2015.
List of IBM Patents or Patent Applications Treated as Related (Appendix P), filed herewith.

\* cited by examiner

FILE MANAGEMENT IN A FILE SYSTEM

The present invention relates to file management in a file system, and more specifically, to a method of increasing file capacity which can be written in a tape drive in the file system which manages files using a tape drive.

BACKGROUND OF THE INVENTION

A file system like a linear tape file system (LTFS) is realized, for example as a mechanism which accesses the data on the tape drive as the file in the file system. In an the LTFS, the data partition for storing data and the index partition for storing meta-information (hereafter, although meta-information may also be called an "index", it is the same meaning) are created. By reading meta-information from the index partition when loading the tape (when mounting the file system), the file system recognizes the data on the tape as files.

In the data partition, after data of a file has been written, as the next record, the meta-information of all the files that are present in the file system at that time point is written as an index. Before the tape is unloaded (the file system is un-mounted), the meta-information of all the files constituting the file system at that time is written as an index at the beginning of the index partition.

When the index is written on the data partition at frequent intervals, the proportion of the meta-information occupies on the data partition becomes too large and the size of data that can be written becomes too small. Therefore, as a compromise, when files have been written, the file system is defined (synchronized) by writing the index after five minutes have passed from the initial write operation. The index that is written is for all the files on the file system at that time point, and is not for the differences from the previous index that was changed. Therefore, if the number of files written increases even if the index is writing every five minutes, the size of the index will also increase in proportion to the number of files, and the file capacity in which can be written on the file system will decrease.

SUMMARY OF THE INVENTION

Embodiments of the present invention include a method, computer program product, and system for writing data. In one embodiment, a memory is mounted. The memory includes a data partition and an index partition. The data partition includes an original data and an original index written directly after the original data. The index partition includes the original index at the beginning of the index partition. The first data is written to a data partition of the memory. The first data is written directly after the at least one data on the data partition and the original index is deleted and invalidated. Responsive to a time interval elapsing, a first index is written to the data partition of the memory. The time interval starts at the writing of the first data. The first index is written directly after the first data on the data partition. Responsive to the time interval elapsing, the first index is written to the index partition of the memory. The time interval starts at the writing of the first data. The first index is written on the index partition at the closest location, in terms of movement time, to the first index on the data partition.

DETAILED DESCRIPTION

Figure 1:
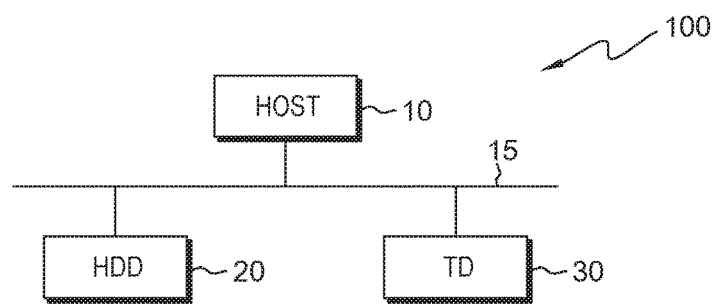
FIG. 1 is a diagram showing a configuration example of a system which performs a file system of one embodiment of the present invention.

The present invention will now be described in detail with reference to the Figures. FIG. 1 is a functional block diagram illustrating a system, generally designated 100, in accordance with one embodiment of the present invention. FIG. 1 provides only an illustration of one implementation and does not imply any limitations with regard to the systems and environments in which different embodiments can be implemented. Many modifications to the depicted embodiment can be made by those skilled in the art without departing from the scope of the invention as recited by the claims.

An embodiment of system 100 includes host 10, hard disk drive (HDD) 20, and tape drive (TD) 30, connected to network 15. Network 15 can be, for example, a local area network (LAN), a telecommunications network, a wide area network (WAN) such as the Internet, or any combination of the three, and include wired, wireless, or fiber optic connections. In general, network 15 can be any combination of connections and protocols that will support communications between host 10, HDD 20, TD 30, and any other computer connected to network 102, in accordance with embodiments of the present invention.

In example embodiments, host 10 can be a laptop, tablet, or netbook personal computer (PC), a desktop computer, a personal digital assistant (PDA), a smart phone, or any programmable electronic device capable of communicating with any computing device within system 100. In certain embodiments, host 10 collectively represents a computer system utilizing clustered computers and components (e.g., database server computers, application server computers, etc.) that act as a single pool of seamless resources when accessed by elements of system 100, such as in a cloud computing environment. In general, host 10 is representative of any electronic device or combination of electronic devices capable of executing computer readable program instructions. Host 10 can include components as depicted and described in further detail with respect to FIG. 10, in accordance with embodiments of the present invention.

In an embodiment, HDD 20 may be implemented with a tape library, optical library, one or more independent hard disk drives, or multiple hard disk drives in a redundant array of independent disks (RAID). In an embodiment, HDD 20 may be built in or integrated with host 10. In an embodiment, HDD 20 may be one or more HDDs. In an embodiment, HDD 20 may be storage devices such as a semiconductor memory (SSD, etc.).

In an embodiment, TD 30 can include a single type or a set type TD. For example, a tape library. In an embodiment, TD 30 may be one or more TDs. In an embodiment, TD 30 may be a data storage device that reads and writes data on a magnetic tape. In an embodiment, TD 30 may be a storage device that provides sequential access storage on the storage device.

In an embodiment, the host 10 mounts/executes a file system used in the present invention. For example, the file system can include linear tape file system (LTFS). The LTFS can carry out direct access to the files stored in the tape cartridge like HDD, a USB memory, or other removable recording medium such as CD-R, if the tape cartridge is inserted in TD. The following explains the example using the LTFS as a file system. In alternative embodiments, other file systems may be used to perform embodiments of the present invention.

In an embodiment of the present invention, the writing of the file to TD 30 is explained in reference to FIG. 2-FIG. 8. FIG. 2-FIG. 8 show the state of the index partition and the data partition of one embodiment of the present invention. In an alternative embodiment, the writing of the file may be to HDD 20.

Figure 2:
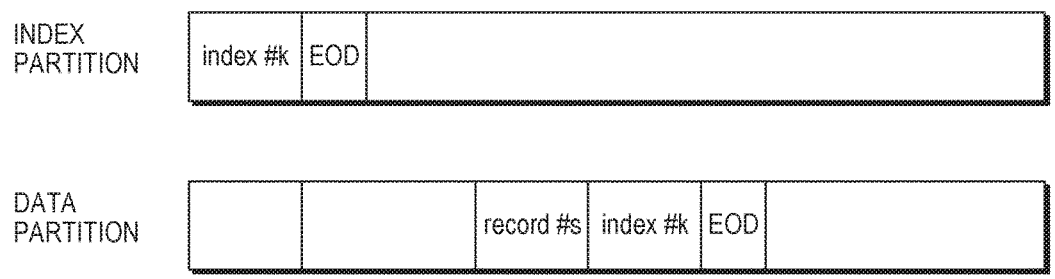
FIG. 2 is a diagram showing a configuration example of the index partition and the data partition of one embodiment of the present invention.

In an embodiment, a tape cartridge is loaded to TD 30. At this time, as shown in FIG. 2, in the head part of the index partition of the tape, the latest meta-information index #k and EOD (End of data) are written. The LTFS is mounted based on the latest meta-information at the time of the load of the tape to TD 30. The meta-information for each file includes the file name, the physical location in which the data of the file is stored, the data size, and other attributes. The last data of the files is written in the data partition of the tape as a record #s followed by index #k and EOD.

Figure 3:
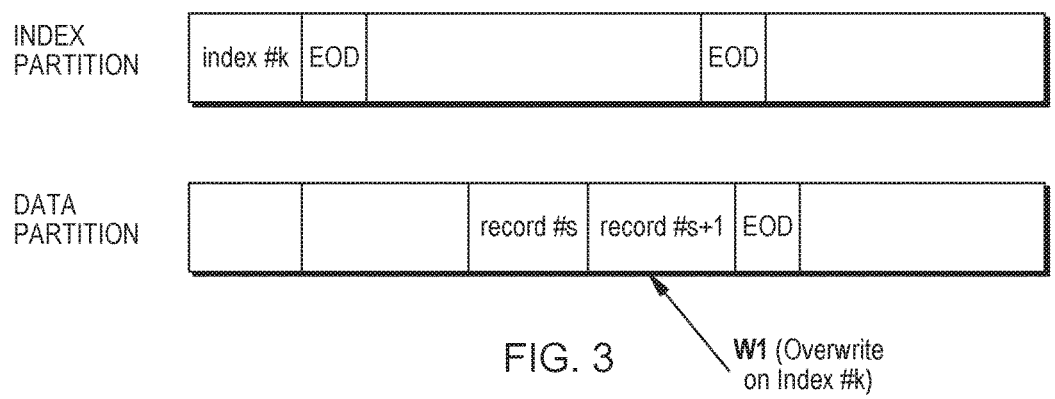
FIG. 3 is a diagram showing a configuration example of the index partition and the data partition of one embodiment of the present invention.
Figure 4:
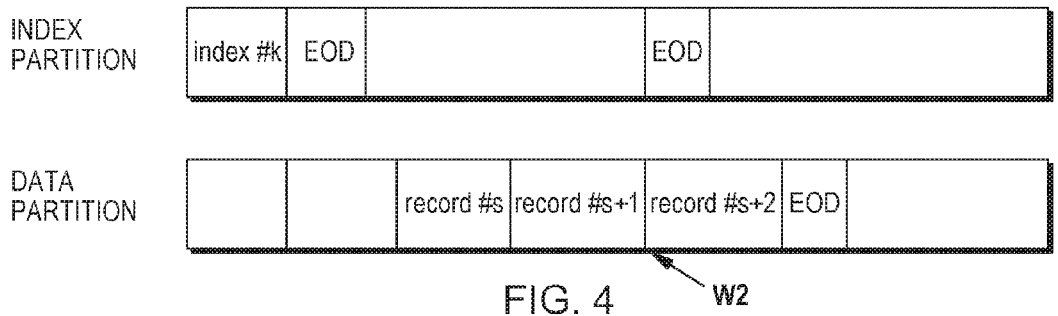
FIG. 4 is a diagram showing a configuration example of the index partition and the data partition of one embodiment of the present invention.

In an embodiment, a new file is written in the LTFS. The data of the file written in the LTFS is stored in the tape as record #s+1 as shown in FIG. 3. At this time, the existing index #k on the data partition is overwritten by record #s+1 (W1 in FIG. 3). Then, if another new file is written in the LTFS, as shown in FIG. 4, the data of the file will be written in as record #s+2 from the next location of record #s+1 (W2 in FIG. 4). In an embodiment, the same operation is repeated for every write of new files.

Figure 5:
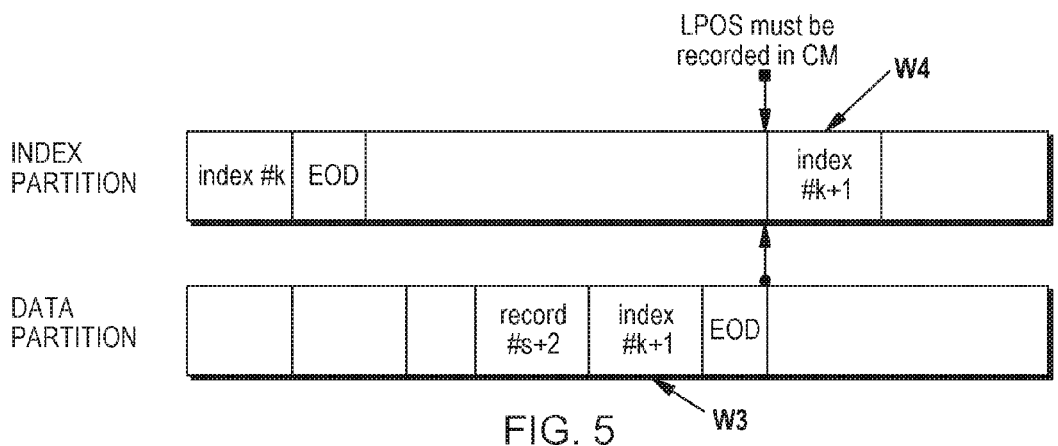
FIG. 5 is a diagram showing a configuration example of the index partition and the data partition of one embodiment of the present invention.

In an embodiment, a certain amount of time elapses (for example, five minutes), as shown in FIG. 5, in order to define the meta-information of the LTFS. The meta-information of all files of the LTFS at that time point is written after the last record "record #s+2" as an index #k+1 by extensible markup language (XML) format (W3 in FIG. 5). In an embodiment the time is set for 5 minutes. In an alternative embodiment the time can be set up arbitrarily in the LTFS for any time interval. In an embodiment, the operation moves to the closest location (in terms of the movement time) on the index partition, and the same index #k+1 is written at that location (W4 in FIG. 5). The location adopted as the movement destination is selected from the areas from EOD onwards on the index partition. Further, after writing the index #k+1, the last position of save (LPOS) location information is recorded on the non-volatile cartridge memory (CM) in the tape cartridge.

Figure 6:
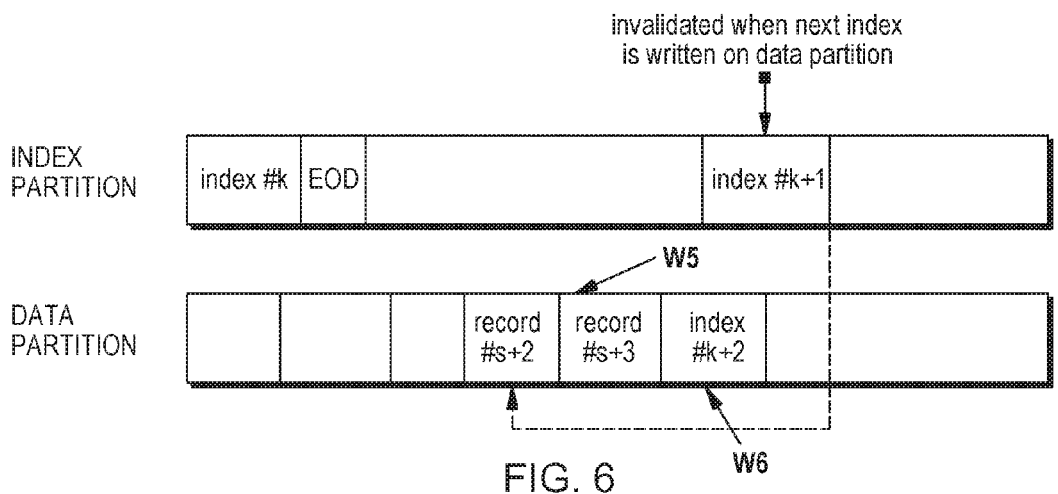
FIG. 6 is a diagram showing a configuration example of the index partition and the data partition of one embodiment of the present invention.

When the next operation to write a file occurs, a new record "record #s+3" is written from the next location after the existing last record "record #s+2" on the data partition as shown in FIG. 6 (W5). That is, the index #k+1 on the data partition in FIG. 5 is overwritten by the new record "record #s+3" (W5 in FIG. 6). After a certain amount of time elapses (for example, five minutes) from the time that the write operations started, in order to define the information of the file system up to the record #s+3, writing of an index #k+2 is performed after the record #s+3 (W6 in FIG. 6). At the time point at which writing of the index #k+2 ends, the information regarding the location at which the index #k+2 is written on the index partition that had been recorded on the non-volatile memory is deleted and invalidated. In addition, when the writing of a still newer file occurs from a write start before the certain amount of time, the writing of record "record #s+n (n=3, 4, 5, . . . )" of the new file is performed like the case which is already explained referring FIG. 3 (W1) or FIG. 4 (W2).

Figure 7:
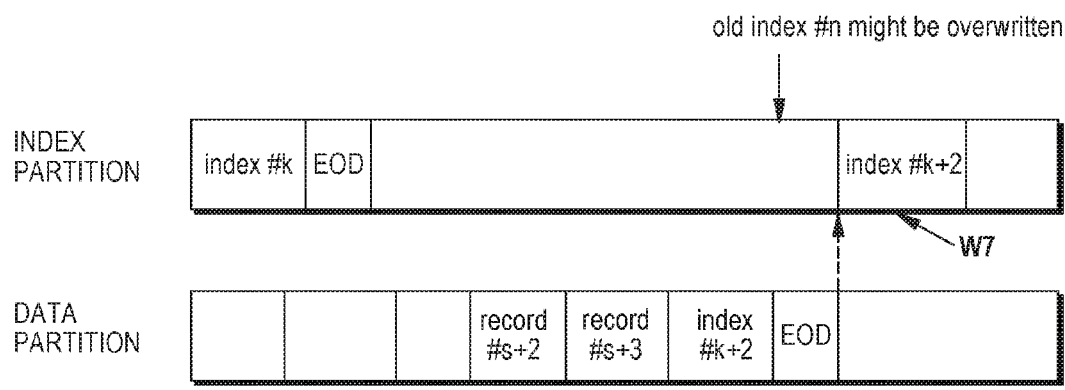
FIG. 7 is a diagram showing a configuration example of the index partition and the data partition of one embodiment of the present invention.

In an embodiment, the operation then moves to the index partition, and the index #k+2 that is the same meta-information as described previously is written from the closest location in terms of the movement time as shown in FIG. 7 (W7). At this time, the index #k+1 that was written five minutes prior thereto might be physically overwritten in some cases. Information regarding the physical location at which the index #k+2 was written is recorded on the non-volatile memory (CM) in the tape cartridge.

Figure 8:
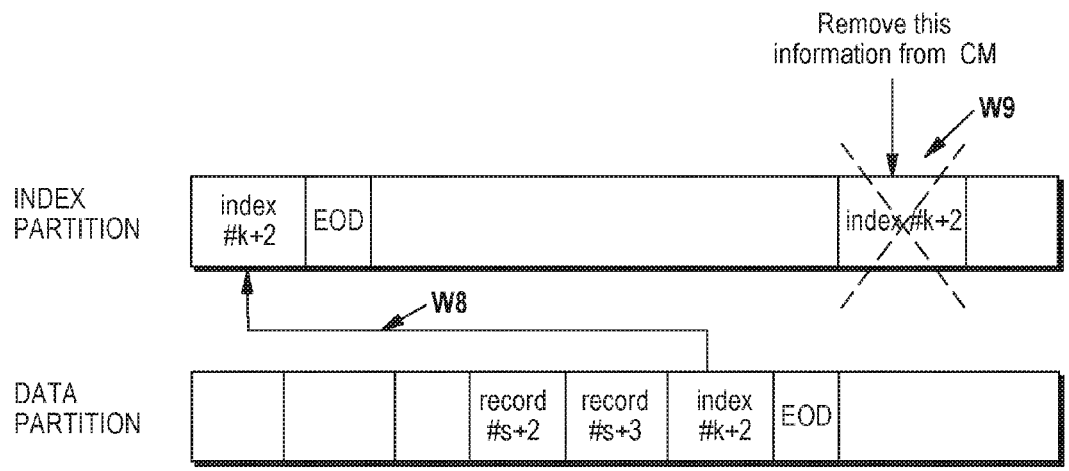
FIG. 8 is a diagram showing a configuration example of the index partition and the data partition of one embodiment of the present invention.

In an embodiment, at the time when the media is being unloaded to unmount the LTFS on the tape of TD30, as shown in FIG. 8, the operation moves to the beginning of the index partition to write the index #k+2 that is the meta-information that was last written (W8 in FIG. 8). Further, the information regarding the physical location of the index #k+2 that was written on the non-volatile memory in the tape cartridge is deleted and invalidated. By a series of above operations, the data write operation to the tape corresponding to the file write request to the LTFS of the tape is completed.

In an embodiment, by using the write operation mentioned above as the configuration example of the present invention, restoration of the file is attained even when the power source of host 10 is intercepted (Power off) in the state of following steps until the tape cartridge is unloaded from the tape drive.

First, after the load of the tape cartridge in TD 30, when a new file has not been written (for example, state of FIG. 2), the LTFS is mounted using the meta-information on the index (for example, index #k in FIG. 2) at the beginning of the index partition.

Second, after the load of the tape cartridge in TD 30, during the period between the time that the initial record is written and the time that writing of an index on the data partition after five minutes have elapsed ends (for example, between FIG. 3 and FIG. 5), the LTFS is mounted using the index at the beginning of the index partition. Files that were written after the loading are not recovered.

Third, during the period between a time that writing of an index on the data partition ended and a time that writing of a next record on the data partition starts (for example, index #k+1 of FIG. 5), the LTFS is mounted using the index that is at the end on the data partition. All files are recovered.

Fourth, during the period between a time that writing of a next record starts and a time that writing of an index on the data partition after five minutes have elapsed ends, the LTFS is mounted using an index written at a physical location of the index partition that was recorded on the non-volatile memory (CM) in the tape cartridge. Files from the record that was written after writing the last index on the data partition are not recovered.

When the data of the file is written by the method of one enforcement configuration of the present invention explained in reference to FIG. 2-FIG. 8, the only index written on the data partition is the index that was written last. For example, in a case where the size of one file is 100 KB, among a data partition of 1.5 TB, 99.5% (1,492.4 GB) can be used for writing the data of files. This can improve the amount of the data partition used about 2.6 times compared with 38.1% (571.0 GB) in the case of the conventional method which does not use an emobdiment of the present invention.

Figure 9:
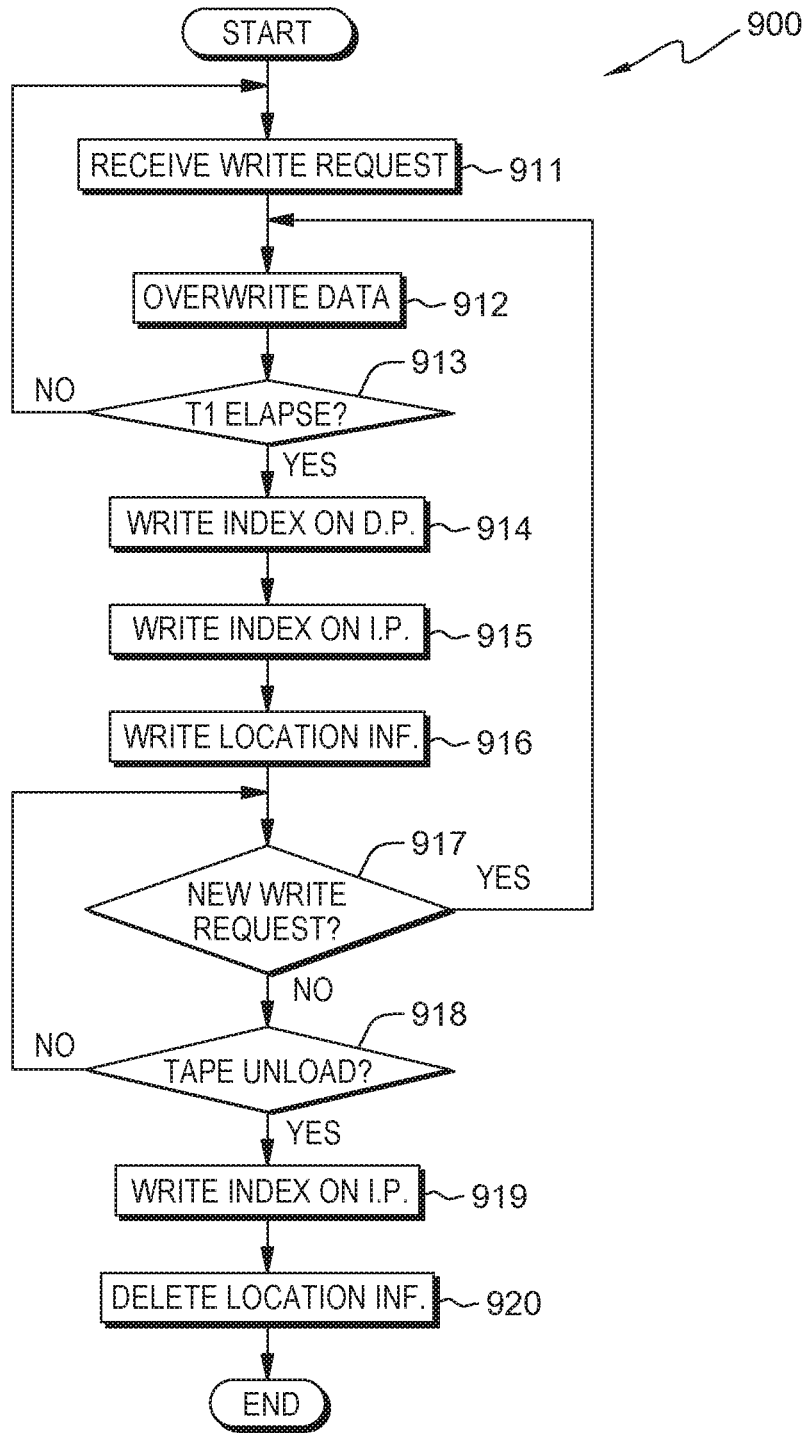
FIG. 9 is a chart showing a flow of the method of one embodiment of the present invention.

FIG. 9 is a flowchart of workflow 900 depicting operational steps for the procedure shown in FIG. 2-FIG. 8, in accordance with an embodiment of the present invention. In an embodiment, the steps of the workflow are performed by the LTFS. In an alternative embodiment, the steps of the workflow are performed by a program (not shown) on host 10. For example, the program may be a program in an Operating System found on host 10. In an alternative embodiment, steps of the workflow can be performed by any other program while working with the LTFS or the program on host 10.

The LTFS receives a write request of a file (step 911). The LTFS overwrites the index (index #k) existing on the data partition with the data of the file (record #s+1), as explained in reference to FIG. 3 (step 912). The LTFS determines whether the predetermined time T1 (for example, five minutes) elapsed since the first record was written or not (decision block 913). If the predetermined time T1 has not elapsed (decision block 913, no branch) the LTFS waits to receive a new write request (step 911). If the predetermined time T1 has elapse (decision block 913, yes branch), the LTFS writes an index (the meta-information) of all files of THE LTFS at that time point is after the last record on the data partition (step 914), as explained in reference to FIG. 5. In an embodiment, the index may be in XML format in order to fix the meta-information on the LTFS.

The LTFS moves to the closest location (in term of the movement time) on the index partition, and the same index is written at that location (W4 in FIG. 5), as explained in reference to FIG. 5 (step 915). LFTS records the location information on the non-volatile memory (CM) in the tape cartridge (step 916).

The LTFS determines whether there is a new write request (decision block 917). If there is a new write request (decision block 917, yes branch) LFTS writes the data of the new file (new record) (step 918). If there is not a new write request (decision block 917, no branch) it is determined whether the tape cartridge is unloaded from the tape drive or not (decision block 918). If the tape cartridge is not unloaded from the tape drive (decision block 918, no branch) the LTFS determines whether there is a new write request (decision block 917). If the tape cartridge is unloaded from the tape drive (decision block 918, yes branch), as explained referring to FIG. 8, the LTFS moves the index in the index partition that was last written to the beginning of the index partition (W8 in FIG. 8) (step 919). The LTFS deletes the information regarding the physical location of the index (W9) that was written on the non-volatile memory in the tape cartridge (step 920), as explained in reference to FIG. 8.

Here, the primary storage location of the index is explained. It is essential to guarantee that the place at which the index is temporarily stored will not be overwritten. In the case of the above mentioned embodiment, a location is used at which writing of the index that is read at the time of loading on the index partition is originally not performed. The location is selected with respect to which moving can be performed at a comparatively high speed if the location is in the same data band. In the proposed method, it is sufficient that this primary storing location is a location that is not overwritten until at least the next sync occurs and a new index is written.

Therefore, part from the free area on the index partition described above, the following areas are also conceivable as a primary storage location for example. First, a third partition other than the index partition and the data partition is defined and used in a dedicated manner as a primary storage location for an index. Second, an area on the data partition is used that is an area in which data has not yet been written, and which will not be overwritten during the period until the next sync occurs.

The embodiment of the present invention has been described with reference to the accompanying drawings. However, the present invention is not limited to the embodiment. The present invention can be carried out in forms to which various improvements, corrections, and modifications are added based on the knowledge of those skilled in the art without departing from the purpose of the present invention.

Figure 10:
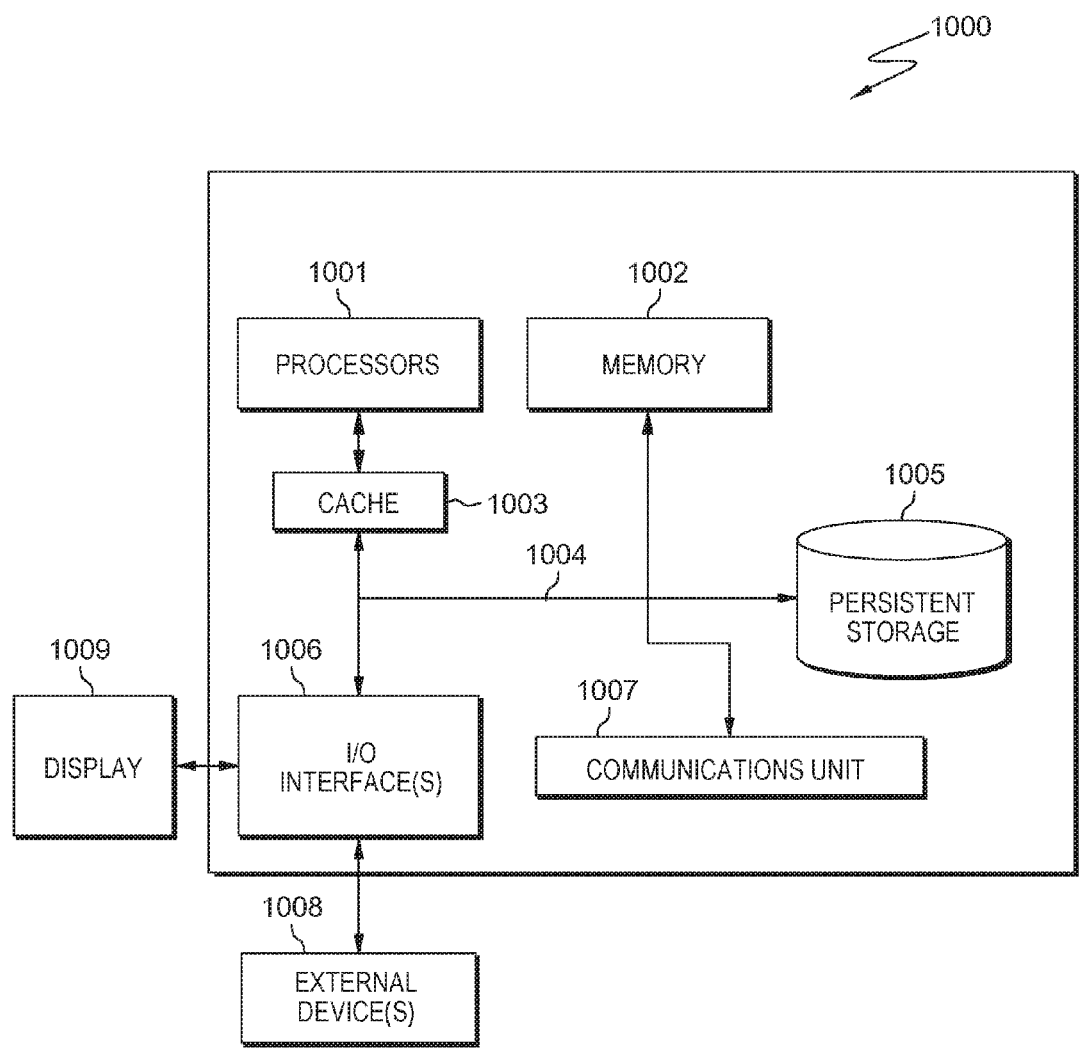
FIG. 10 depicts a block diagram of components of the host of FIG. 1, in accordance with an embodiment of the present invention.

FIG. 10 depicts computer system 1000, that is an example of a system that includes a program to perform some or all of the steps in flow 900. Computer system 1000 includes processors 1001, cache 1003, memory 1002, persistent storage 1005, communications unit 1007, input/output (I/O) interface(s) 1006 and communications fabric 1004. Communications fabric 1004 provides communications between cache 1003, memory 1002, persistent storage 1005, communications unit 1007, and input/output (I/O) interface(s) 1006. Communications fabric 1004 can be implemented with any architecture designed for passing data and/or control information between processors (such as microprocessors, communications and network processors, etc.), system memory, peripheral devices, and any other hardware components within a system. For example, communications fabric 1004 can be implemented with one or more buses or a crossbar switch.

Memory 1002 and persistent storage 1005 are computer readable storage media. In this embodiment, memory 1002 includes random access memory (RAM). In general, memory 1002 can include any suitable volatile or non-volatile computer readable storage media. Cache 1003 is a fast memory that enhances the performance of processors 1001 by holding recently accessed data, and data near recently accessed data, from memory 1002.

Program instructions and data used to practice embodiments of the present invention may be stored in persistent storage 1005 and in memory 1002 for execution by one or more of the respective processors 1001 via cache 1003. In an embodiment, persistent storage 1005 includes a magnetic hard disk drive. Alternatively, or in addition to a magnetic hard disk drive, persistent storage 1005 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1005 may also be removable. For example, a removable hard drive may be used for persistent storage 1005. Other examples include optical and magnetic disks, thumb drives, and smart cards that are inserted into a drive for transfer onto another computer readable storage medium that is also part of persistent storage 1005.

Communications unit 1007, in these examples, provides for communications with other data processing systems or devices. In these examples, communications unit 1007 includes one or more network interface cards. Communications unit 1007 may provide communications through the use of either or both physical and wireless communications links. Program instructions and data used to practice embodiments of the present invention may be downloaded to persistent storage 1005 through communications unit 1007.

I/O interface(s) 1006 allows for input and output of data with other devices that may be connected to each computer system. For example, I/O interface 1006 may provide a connection to external devices 1008 such as a keyboard, keypad, a touch screen, and/or some other suitable input device. External devices 1008 can also include portable computer readable storage media such as, for example, thumb drives, portable optical or magnetic disks, and memory cards. Software and data used to practice embodiments of the present invention can be stored on such portable computer readable storage media and can be loaded onto persistent storage 1005 via I/O interface(s) 1006. I/O interface(s) 1006 also connect to display 1009.

Display 1009 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for writing data, the method comprising the steps of:
   mounting, by one or more computer processors, a memory, wherein the memory includes a data partition and an index partition, and wherein the data partition includes an original data and an original index written directly after the original data, and wherein the index partition includes the original index at the beginning of the index partition, and wherein the index partition is placed vertically above the data partition, and wherein a beginning of the index partition aligns with a beginning of the data partition;
   writing, by one or more computer processors, a first data to the data partition of the memory, wherein the first data is written directly after the original data on the data partition and wherein the original index is deleted on the data partition;
   responsive to a time interval elapsing, wherein the time interval starts at the writing of the first data, writing, by one or more computer processors, a first index to the data partition of the memory and to the index partition of the memory, wherein the first index on the index partition is written at a closest location, in terms of movement time, to the first index on the data partition; and
   responsive to receiving an indication to unmount the memory, moving, by one or more computer processors, the first index on the index partition from the closest location to the first index on the data partition to the beginning of the index partition.

2. The method of claim 1, wherein the memory is a linear tape file system.

3. The method of claim 1, wherein the original index is written on a non-volatile cartridge memory in the memory and wherein the first index is written on the non-volatile cartridge memory in the memory.

4. The method of claim 1, wherein the index includes one or more of the following: a physical location in which the data is stored, a size of the data, and a file name of the data.

5. The method of claim 1, wherein the first index is written on the index partition at a location after the original index.

6. The method of claim 1, wherein the first index is written in extensible markup language (XML).

7. A computer program product for writing data, the computer program product comprising:
   one or more computer readable storage media; and
   program instructions stored on the one or more computer readable storage media, the program instructions comprising:
   program instructions to mount a memory, wherein the memory includes a data partition and an index partition, and wherein the data partition includes an original data and an original index written directly after the original data, and wherein the index partition includes the original index at the beginning of the index partition, and wherein the index partition is placed vertically above the data partition, and wherein a beginning of the index partition aligns with a beginning of the data partition;
   program instructions to write a first data to the data partition of the memory, wherein the first data is written directly after the original data on the data partition and wherein the original index is deleted on the data partition;
   program instructions, responsive to a time interval elapsing, wherein the time interval starts at the writing of the first data, to write a first index to the index partition of the memory, wherein the first index on the index partition is written at a closest location, in terms of movement time, to a first index on the data partition; and
   responsive to receiving an indication to unmount the memory, move the first index on the index partition from the closest location to the first index on the data partition to the beginning of the index partition.

8. The computer program product of claim 7, wherein the memory is a linear tape file system.

9. The computer program product of claim 7, wherein the original index is written on a non-volatile cartridge memory in the memory and wherein the first index is written on the non-volatile cartridge memory in the memory.

10. The computer program product of claim 7, wherein the index includes one or more of the following: a physical location in which the data is stored, a size of the data, and a file name of the data.

11. The computer program product of claim 7, wherein the first index is written on the index partition at a location after the original index.

12. The computer program product of claim 7, wherein the first index is written in extensible markup language (XML).

13. A computer system for writing data, the computer system comprising:
   one or more computer processors;
   one or more computer readable storage media; and
   program instructions, stored on the one or more computer readable storage media for execution by at least one of the one or more computer processors, the program instructions comprising:
   program instructions to mount a memory, wherein the memory includes a data partition and an index partition, and wherein the data partition includes an original data and an original index written directly after the original data, and wherein the index partition includes the original index at the beginning of the index partition, and wherein the index partition is placed vertically above the data partition, and wherein a beginning of the index partition aligns with a beginning of the data partition;

program instructions to write a first data to the data partition of the memory, wherein the first data is written directly after the original data on the data partition and wherein the original index is deleted on the data partition;

program instructions, responsive to a time interval elapsing, wherein the time interval starts at the writing of the first data, to write a first index on the index partition of the memory, wherein the first index on the index partition is written at a closest location, in terms of movement time, to a first index on the data partition; and responsive to receiving an indication to unmount the memory, move the first index on the index partition from the closest location to the first index on the data partition to the beginning of the index partition.

14. The computer system of claim 13, wherein the memory is a linear tape file system.

15. The computer system of claim 13, wherein the original index is written on a non-volatile cartridge memory in the memory and wherein the first index is written on the non-volatile cartridge memory in the memory.

16. The computer system of claim 13, wherein the index includes one or more of the following: a physical location in which the data is stored, a size of the data, and a file name of the data.

17. The computer system of claim 13, wherein the first index is written on the index partition at a location after the original index.

* * * * *